Oct. 29, 1968  J. PRAHL  3,407,409
KNEE JOINT FOR AN ARTIFICIAL LEG
Filed July 9, 1965
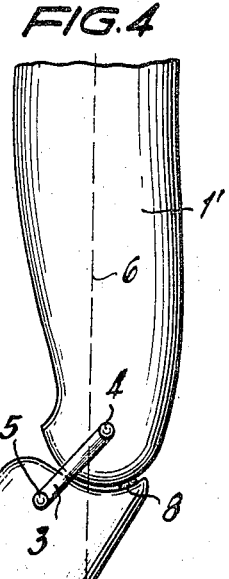
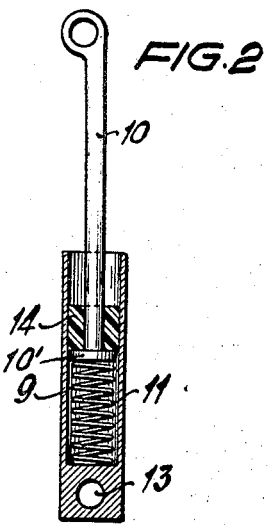
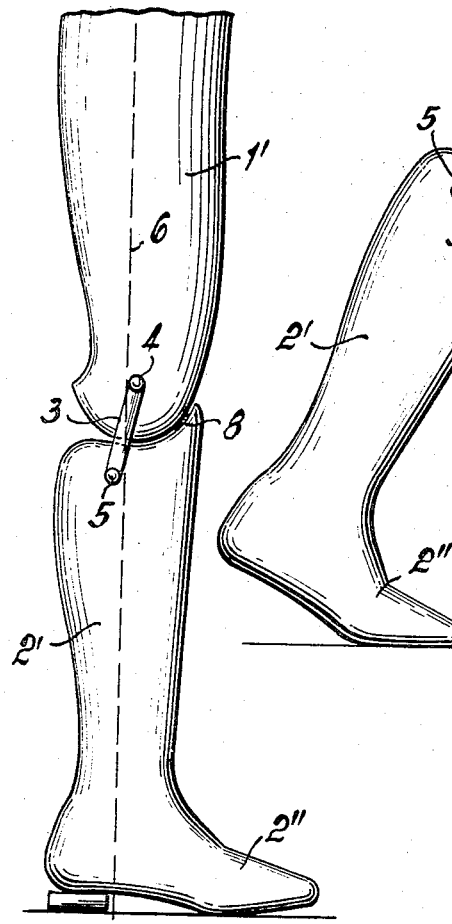
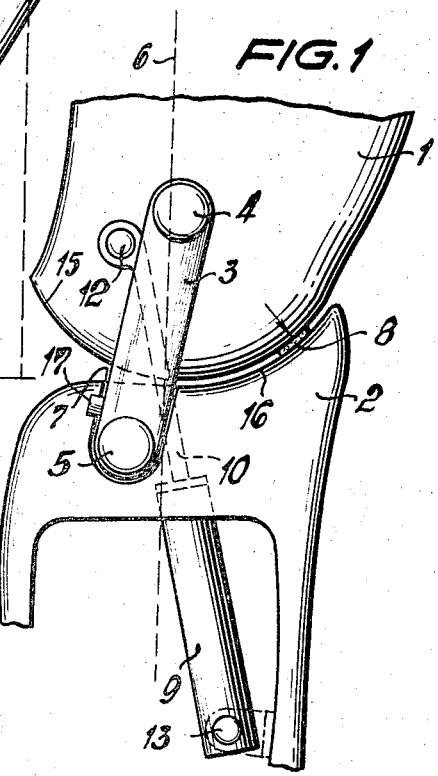
INVENTOR
Jan Prahl
By Richard Low
Ag't United States Patent Office 3,407,409
Patented Oct. 29, 1968

3,407,409
KNEE JOINT FOR AN ARTIFICIAL LEG
Jan Prahl, Frankfurt am Main, Germany, assignor to Wilhelm Julius Teufel, Stuttgart, Germany, a limited-liability company of Germany
Filed July 9, 1965, Ser. No. 470,788
Claims priority, application Germany, Oct. 5, 1964, T 27,140
7 Claims. (Cl. 3—27)

ABSTRACT OF THE DISCLOSURE

The thigh and shank of an artificial leg are connected by a linkage consisting of two rigid link members and pivots on the ends of the link members which attach the link members to the thigh and shank for angular movement about respective fixed axes. An end face of the thigh is of circular section about the corresponding pivot axis and may be conformingly engaged by a corresponding face portion of the shank. A friction facing is located on the face portion of the shank forward of the location of the common axis of thigh and shank in the straightened leg position. An adjusting means is provided for setting the position of the link members about the pivot axis of the shank.

---

This invention relates to artificial limbs, and particularly to a knee joint for an artificial leg.

It is known to provide a knee joint for an artificial leg with a brake that prevents the thigh and shank members of the joint from moving angularly relative to each other when the leg is in the straightened position, and the weight of the wearer is applied to the thigh member. The brake is automatically released when the weight is lifted from the artificial leg so as to permit the swinging movement of the shank member necessary for normal walking.

If the other leg stumbles, or an obstacle is encountered while the artificial leg is bent at the knee joint, the brake in the knee joint of the known device remains inoperative, and the artificial leg collapses under the applied weight.

The primary object of the invention is the provision of a knee joint for an artificial leg which permits the weight of the wearer to be applied to the bent knee joint without causing angular movement of the thigh and shank members relative to each other, yet permits such angular movement to take place freely if the leg does not carry body weight.

Generally, the invention aims at providing an artificial leg which may be loaded in any relative position of the thigh and shank members and becomes practically rigid in the position in which the load is applied.

With these and other objects in view, the invention in its more specific aspects provides a linkage which connects the thigh and shank portions for pivoting movement in a plane toward and away from the straightened position in which the longitudinal axes of the shank and thigh members substantially coincide.

The linkage includes a first pivot having a first axis perpendicular to the plane of pivotal movement and located on the thigh member. A second pivot having a corresponding second axis is arranged on the shank member. A link member is attached to the two pivots. The thigh member has an end face of circular cross section in the aforementioned plane about the first axis, and at least a portion of an end face of the shank member is conformingly engageable with the circular face of the thigh member and carries a friction facing.

The first pivot axis is closely adjacent the axis of the thigh member. The second pivot axis is rearwardly spaced from the axis of the thigh member in the straightened position of the leg, and the shank member moves rearwardly away from the axis of the thigh member during pivoting movement of the leg members about the first axis away from the straightened position. The friction facing is forwardly spaced from the axis of the thigh member in the straightened leg position, and forwardly spaced from the second pivot axis in all operative positions of the leg.

Forward pivotal movement of the shank portion about the first pivot axis is arrested in the straightened position by a stop, and pivotal movement of the link member about the second pivot axis is narrowly and adjustably limited. A yieldably resilient compression device is interposed between a portion of the thigh member rearwardly spaced from the first axis and a portion of the shank member forwardly spaced from the second axis, and thereby biases the knee joint toward its straightened position.

Other features and many of the attendant advantages of this invention will be readily appreciated as the same becomes better understood from the following detailed description of a preferred embodiment when considered with the annexed drawing in which:

FIG. 1 shows the load-bearing elements of a knee joint of the invention in the straightened position, in side elevation;

FIG. 2 illustrates a detail of the device of FIG. 1 in elevational section;

FIG. 3 shows an artificial leg including the knee joint of FIG. 1 in a corresponding position and view on a smaller scale; and FIG. 4 illustrates the leg of FIG. 3 in partly bent position.

Referring now to the drawing in detail, and initially to FIG. 1, there is shown a knee joint of the invention without its outer casing. The joint is formed by cooperating portions of a thigh member 1 and of a shank member 2 which are connected by two elongated links 3 of which only one is visible in the drawing. Corresponding first ends of the links 3 are mounted on the two ends of a pivot pin 4 whose axis is horizontal in the normal walking positions of the leg shown in FIGS. 3 and 4, and which is journaled in the thigh member 1.

The second ends of the links 3 are fastened to a pivot pin 5 which is journaled in the shank member 2 and whose axis is parallel to that of the pin 4. The second ends of the links are received in a slot 7 of the shank member 2 which limits the pivoting positions of the links 3 with respect to the axis of the pin 5 to a small acute angle. This angle is precisely defined by an abutment bar 17 which is partly received in a groove formed in the shank member and partly projects into the slot 7. The position of the links 3 may be varied to specific requirements by replacing the bar 17 by another bar which projects more or less into the slot 7.

The bottom face 15 of the thigh member 1 is of circular cross section about the axis of the pin 4, and the top face of the shank member has a portion 16 which approximately conforms to the bottom face 15, and carries a friction facing 8. The friction facing 8 extends about the axis of the pin 4 in an arc of less than 15°.

FIG. 3 shows an artificial leg including the knee joint of FIG. 1 whose load-bearing elements are largely concealed in a thigh casing 1' and a shank casing 2', which has a foot portion 2". Only the links 3, the associated pivot pins 4, 5, and the friction facing 8 are visible. In the straightened position of the leg illustrated in FIG. 3, the longitudinal axis 6 of the thigh portion coincides with the axis of the shank portion and is closely adjacent the axis of the pin 4, whereas the axis of the pin 5 is spaced from the longitudinal axis 6 in a rearward direction. The axis 6 practically also coincides with the line of force of the body weight transmitted by the thigh portion to the shank portion of the leg when the bearer is upright and the leg is straightened.

The shank portion of the artificial leg is biased from the bent position illustrated in FIG. 4 toward the straightened position of FIG. 3 by a spring device which also arrests the clockwise angular movement of the shank portion in the position shown in FIG. 3. The cooperation of the spring device with other elements of the knee joint is illustrated in FIG. 1, and details of its structure are best seen in FIG. 2.

The spring device essentially consists of a cylindrical sleeve 9 having one closed end and one open end through which a coaxial rod 10 may move inward and outward of the sleeve 9. A helical compression spring 11 is interposed between the closed sleeve end and an enlarged head 10' of the rod 10 in the sleeve 9. A centrally perforated plug 14 fastened in the sleeve 9 limits the outward movement of the head 10' under the force of the spring 11 and guides the rod 10. The plug 14 consists of resilient plastic.

The outer end of the rod 10 is fastened to the thigh member 1 by a pivot pin 12 whose axis is rearwardly spaced from the axis of the pin 4 in the straightened leg position, as shown in FIG. 1, and parallel to the latter axis. The closed end of the sleeve 9 is pivotally secured to the shank member 2 by a pin 13 located in front of the pin 5.

The aforedescribed knee-joint operates as follows:

When the artificial leg is in the straightened position shown in FIG. 1 and the wearer is upright, the body weight transmitted from the thigh portion to the shank portion produces a torque in the knee joint because the axes of the pins 4, 5 are transversely offset relative to the longitudinal leg axis 6. The body weight tends to pivot the thigh member 1 about the axis of the pin 5 in a clockwise direction, as viewed in FIG. 1 and indicated by an arrow. The contact pressure at the location of the friction facing 8 is increased. It will be noted that the friction facing is spaced forward of the longitudinal leg axis 6 by an angle more than 30° relative to the axis of the pivot pin 4 when the leg is in the straightened position.

Bending of the leg occurs normally during walking while the full weight of the body is shifted to the other leg and while the thigh is being swung forward and upward. During such normal bending, the spring 11 tends to move the friction facing 8 away from the bottom face 15 of the thigh member 1, and the friction facing does not interfere with normal bending movements. When body weight is applied to the bent leg, and the leg touches the ground, as may occur when the wearer stumbles and as illustrated in FIG. 4, an even greater component of the body weight is brought to bear on the friction facing 8 than in the position of FIG. 3, because the friction facing is brought nearer the longitudinal axis 6 of the thigh portion by bending.

The spring device tends to move the shank member 2 into longitudinal alignment with the thigh member 1. The force of the spring 11 must therefore be selected so that it may be overcome by the weight and inertia of the shank portion of the leg during normal walking while the thigh is being lifted. Expansion of the spring 11 during downward movement of the thigh portion tends to straighten the leg until further spring expansion is stopped by the plug 14. The plug 14 limits the counterclockwise movement of the shank member 2 about the pin 4, as viewed in FIG. 1.

The knee joint of the invention permits the normal walking movements of the thigh and shank portions of the artificial leg, and prevents relative movement of the two portions when body weight is applied in the straightened leg position. Additionally, the knee jont of the invention brakes or prevents angular movement of the thigh and shank portions toward each other when body weight is applied to the leg in the bent condition. The knee joint of the invention thus slows or prevents collapse of the artificial leg under the wearer when weight is transferred to the bent leg as may occur during stumbling or when an obstacle is met.

This safety feature of the knee joint of the invention is brought about by the specific location of the axes of the pins 4, 5 and also by the location of the friction facing 8. A straight line drawn through the axes does not intersect the friction facing in any load-bearing position of the leg, and the friction facing is forwardly spaced from the longitudinal axis of the thigh member in the straightened leg position.

It should be understood, of course, that the foregoing description relates only to a preferred embodiment of the invention, and that it is intended to cover all changes and modifications of the example of the invention chosen for the purpose of the disclosure which do not constitute departures from the spirit and scope of the attached claims.

What I claim is:

1. An artificial leg comprising, in combination:
   (a) a thigh member,
   (b) a shank member, each of said members having a longitudinal axis,
   (c) linkage means connecting said members for pivoting movement in a plane toward and away from a straightened position in which the axes of said members are aligned and substantially coincide, said linkage means including
      (1) a first pivot on one of said members, said pivot having a first pivot axis transverse of said plane and fixed relative to said one member, said first pivot axis being closely adjacent the longitudinal axis of said one member,
      (2) a second pivot on the other of said members, said second pivot having a second pivot axis transverse of said plane, fixed relative to said other member, and spaced from said first pivot axis in said plane, said second pivot axis being rearwardly spaced from said first pivot axis in said straightened position of said members,
      (3) a link member having two end portions attached to said first and second pivot, respectively,
      (4) said one member having an end face of circular cross section in said plane about said first pivot axis, said other member having an end face including a portion adapted to engage conformingly the end face of said one member,
      (5) said shank member moving rearwardly away from the longitudinal axis of said thigh member during pivoting movement away from said straightened position,
   (d) a friction facing on the end face portion of said other member, said friction facing being spaced forwardly of the longitudinal axis of said thigh member in said straightened position, and
   (e) adjusting means for setting the position of said link member about said second pivot axis.

2. A leg as set forth in claim 1, wherein said friction facing is spaced forwardly of the longitudinal axis of said thigh member by an angle of at least 30° relative to said first pivot axis in said straightened position.

3. A leg as set forth in claim 2, wherein said friction facing extends over an angle of not more than 15° about said first pivot axis in said plane.

4. A leg as set forth in claim 1, further comprising yieldably resilient compression means, a respective first and second portion of said compression means being secured to a portion of said thigh member rearwardly spaced from said first pivot axis, and to said shank member for biasing said thigh and shank members toward said straightened position thereof.

5. A leg as set forth in claim 4, wherein said second portion of said compression means is secured to a portion of said shank member forwardly spaced from said second pivot axis.

6. In the leg as set forth in claim 1, said one member being said thigh member, said other member being said shank member, said friction facing being spaced forwardly of said second pivot axis in said straightened position and being spaced forwardly of said first pivot axis in all operative angular positions of said thigh and shank members, said adjusting means permitting the position of said link member to be set within a small acute angle, yieldable compression means having respective portions secured to a portion of said thigh member rearwardly spaced from said first pivot axis and to a portion of said shank member forwardly spaced from said second pivot axis.

7. A leg as set forth in claim 1, wherein said friction facing is spaced from a line in said plane connecting said first and second pivot axes in all relative operative positions of said thigh member and of said shank member.

References Cited

UNITED STATES PATENTS

| 668,634 | 2/1901 | Gault | 3—29 |
| 783,226 | 2/1905 | Seeley | 3—29 |
| 2,057,534 | 10/1936 | McCann | 3—22 |
| 2,073,807 | 3/1937 | Ronowsky | 3—29 XR |
| 2,853,712 | 9/1958 | Bach | 3—27 |

FOREIGN PATENTS

| 843,880 | 7/1952 | Germany. |
| 897,906 | 11/1953 | Germany. |

OTHER REFERENCES

J. W. Edwards, "Artificial Limbs." In Orthopaedic Appliances Atlas, Ann Arbor, Mich., vol. 2, 1960, pp. 186, 188, 189 and 226, Figures 5.79(d) and 5.121 relied upon. Copy available in Group 335.

RICHARD A. GAUDET, *Primary Examiner.*

R. L. FRINKS, *Assistant Examiner.*